United States Patent [19]

Csehi

[11] Patent Number: 5,188,651
[45] Date of Patent: Feb. 23, 1993

[54] METHOD AND APPARATUS FOR HEAT TREATING GLASS SHEETS

[75] Inventor: Dennis M. Csehi, Oregon, Ohio

[73] Assignee: Libbey-Owens-Ford Co., Toledo, Ohio

[21] Appl. No.: 809,404

[22] Filed: Dec. 18, 1991

[51] Int. Cl.[5] .............................................. C03B 27/04
[52] U.S. Cl. ........................................ 65/114; 15/163; 15/349; 15/289
[58] Field of Search .................. 65/114, 163, 349, 289

[56] References Cited

U.S. PATENT DOCUMENTS 3,994,711 11/1976 McMaster ............................. 65/163
4,617,043 10/1986 Reunamaki ....................... 65/114 X
4,816,055 3/1989 Reunamaki et al. ................. 65/114

Primary Examiner—Robert L. Lindsay
Attorney, Agent, or Firm—Marshall & Melhorn

[57] ABSTRACT

A system is provided for heating and thermally conditioning glass sheets, wherein sheets are conveyed individually or in groups or loads through a tunnel-type heating furnace and thermal conditioning area upon a series of aligned rollers. The rollers are driven in groups, with each group having an independent drive mechanism. The independent drive mechanisms are provided with interrelated controls whereby the system is controlled in zones of one or more groups of rolls. A sheet or load of sheets is advanced into a zone, and the rolls within that zone are then driven to convey the sheet or load in an oscillating forward and reverse manner to oscillate the glass within the zone. The oscillation proceeds according to a predetermined schedule whereby the distances travelled by the sheet or load on each forward and reverse stroke varies according to a predetermined pattern so that the contact points between the glass and rolls is different upon each reversal in direction. Similar oscillating schedules may be employed in subsequent zones of the heating furnace, as well as in a thermal conditioning region through which the sheet or load is conveyed.

20 Claims, 3 Drawing Sheets

METHOD AND APPARATUS FOR HEAT TREATING GLASS SHEETS

BACKGROUND OF THE INVENTION

1. Field of the Invention

The present invention pertains generally to the heating and thermal conditioning of glass sheets, and more particularly to an apparatus and a method of operation thereof for efficiently and relatively inexpensively producing flat, thermally-conditioned architectural glazing units of superior quality.

2. Description of the Prior Art

Glass for automotive and architectural purposes is generally produced as a continuous glass ribbon which is annealed and served into individual blanks of suitable dimensions for subsequent use. Such blanks to be fabricated into automotive glass parts are trimmed to a desired shape and then reheated to their softening temperature and bent to a desired configuration. The bent sheets destined for sidelite and backlite use, while still in a heated condition, are subjected to a rapid quenching or cooling so as to quickly lower their temperature below the strain point temperature and cause thermal tempering of the lite. Those bent sheets destined to be made into windshields are gradually cooled and annealed, and then laminated in pairs to a plastic interlayer material. Due to the nature of the industry, automobile glazing units of the same configuration can be produced at a high volume for an extended period of time. Consequently, the construction of elaborate relatively expensive facilities wherein glass sheets advance in succession continuously through heating, bending and thermal conditioning sections can be justified.

Tempered glass units for architectural purposes are produced in much smaller quantities and in less standardized dimensions. Thus, large expenditures to build and operate the relatively long heating furnaces and tempering and cooling sections of the type used for automotive production and necessary for continuous, straight through operation may not be justified. From an economic standpoint it is desirable to employ a facility having much shorter, and thus less expensive, heating and thermal conditioning sections within which the glass could be heated to a temperature above its strain point and then rapidly chilled below the strain point for achieving a suitable degree of thermal temper in the glass. However, heating and quenching of the glass are time dependent, and there are practical limitations to the minimum time interval within which the glass can be heated to the strain point temperature and then quenched and cooled to handling temperature. If the glass sheets are stopped within the heating furnace, or advanced therethrough at a very low speed to allow time for the sheets to reach the desired temperature throughout, they may tend to sag and bend between the lines of support provided by the spaced conveyor rolls. Extended contact along concentrated areas by the conveyor rolls may also result in optical defects on the glass surface known as roll marks.

In order to minimize the aforementioned conditions in the heating and tempering of glass in short facilities, it has been proposed to reciprocally convey a glass sheet load back and forth in an oscillatory manner within the heating chamber and/or quenching section. It is thus possible to achieve the necessary dwell time within the chamber without holding the glass in a static position for a significant time or conveying the glass at such a slow speed as to permit sagging of the glass in the unsupported area between adjacent conveyor rolls.

A number of proposals have been put forth heretofore for alleviating the aforementioned problems by conveying glass sheets in an oscillating manner during heating and/or thermal conditioning. The devices and methods disclosed in U.S. Pat. Nos. 1,856,669, 3,994,711, 4,297,121, 4,300,937, 4,591,374, 4,528,016, 4,617,043 and 4,816,055, for example, pertain to various designs and methods including oscillating or reciprocating movement of glass sheets. Reexamination Certificate B1 3,994,711, issued Jul. 3, 1990, contains an exhaustive list of patents dealing with the subject. Despite the extensive prior art, none of the disclosed systems has proven entirely successful in overcoming the aforementioned problems in producing thermally conditioned glass sheets of high quality within a relatively inexpensive facility.

SUMMARY OF THE INVENTION

There is provided in accordance with the present invention a system for heating and thermally conditioning glass sheets including an elongated tunnel-type heating furnace through which the glass sheets are conveyed individually, or in loads comprised of a plurality of sheets, upon a series of aligned rollers. The aligned rollers continue beyond the heating furnace into and through a thermal conditioning area, which may include tempering blastheads and/or a controlled cool down zone. The rollers are driven in groups, with each group being provided with an independent drive mechanism. The several independent drive mechanism are provided with interrelated controls whereby the groups of rolls are driven according to predetermined patterns prescribed by the dimensions of the individual sheets or loads of sheets, as well as the number and configuration of the rolls and groups of rolls and the temperature within the heating furnace. The system is controlled in zones of one or more groups of rolls whereby sheets or loads of sheets are advanced into a zone, and the rolls within the zone are then driven in an oscillating forward and reverse manner to oscillate the glass within the zone. The oscillation proceeds in accordance with a predetermined schedule whereby the distance travelled by the glass sheet or load of sheets on each forward and reverse stroke increases or decreases according to a prescribed pattern so that the contact points between the glass sheets and rolls is different on each reversal in direction during the cycle. Upon completion of a cycle the glass load is advanced to a succeeding zone, either for further heating within the furnace as required or for thermal conditioning outside the heating furnace. A similar oscillating schedule may be employed within the thermal conditioning region, particularly where the thermal conditioning includes movement of the glass between opposed blastheads immediately upon exiting the furnace for rapid cooling to produce thermally tempered glass.

BRIEF DESCRIPTION OF THE DRAWINGS

In the drawings, wherein like numerals are employed to designate like parts throughout.

DESCRIPTION OF THE PREFERRED EMBODIMENT

Figure 1:
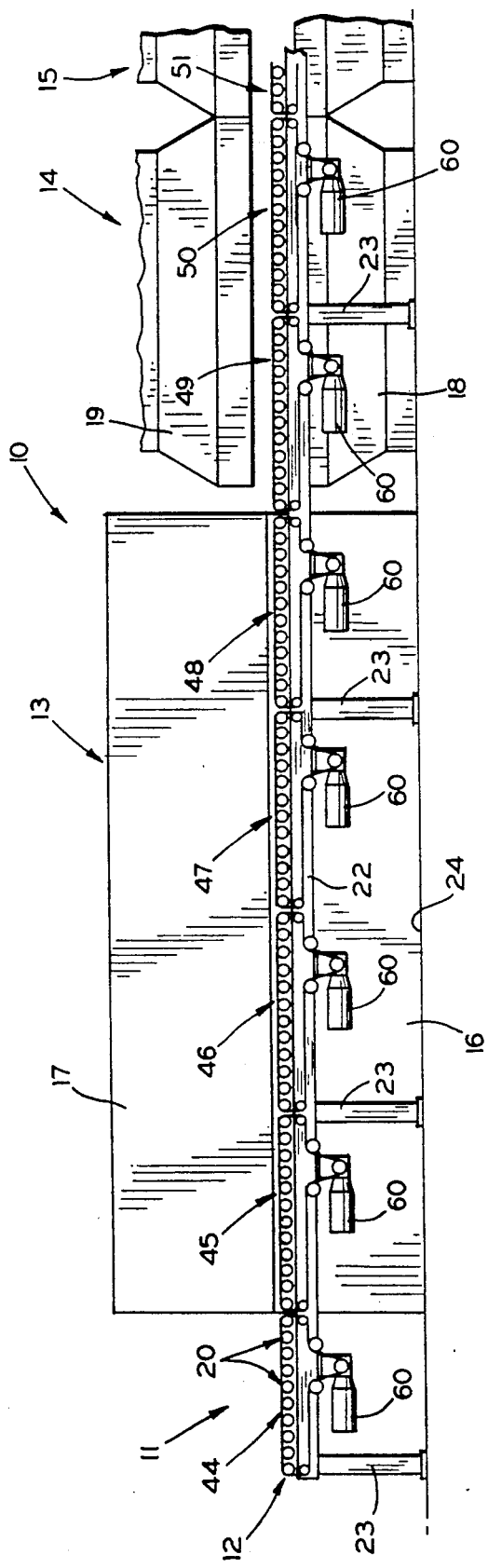
FIG. 1 is a schematic longitudinal elevation of a glass sheet heating furnace and associated thermal conditioning section constructed in accordance with the invention.

With reference to the drawings, and in particular to FIG. 1 thereof, there is identified generally at 10 a glass sheet heating and thermal conditioning facility embodying the invention. The facility more particularly includes a loading zone 11 whereat glass sheets S (FIGS. 2 and 3) are loaded upon a conveyor system 12 to be carried into and through a heating furnace 13 and a thermal conditioning unit 14, and thereafter to a cool down and unloading area, partially shown at 15.

The heating furnace 13 is preferably a conventional tunnel-type furnace, and may advantageously be of a standardized modular construction of the type disclosed in U.S. Pat. No. 4,983,202 for purposes of economy and flexibility in construction. Such furnaces include a lower enclosure section 16 and an independently supported upper enclosure section 17, with the conveyor system 12 extending longitudinally through the tunnel-like enclosure defined by the upper and lower enclosure sections. The thermal conditioning unit 14 generally comprises a conventional blasthead system for thermally tempering the glass sheets as they emerge from the heating furnace, although it is contemplated that it may likewise serve along with the cool down section 15, to gradually cool the glass sheets in a controlled manner for annealing purposes. More particularly, the thermal conditioning and cool down sections may include a lower enclosure 18 contiguous with the lower furnace enclosure 16, and which may incorporate devices (not shown) for directing cooling air upwardly against the lower surfaces of the sheets. The thermal conditioning and cool down sections also include hooded enclosures 19 over the conveyor 12 which may also incorporate devices (not shown) for directing cooling air against the upper surfaces of the sheets.

The conveyor 12 comprises a plurality of closely spaced individual rollers 20, longitudinally aligned and disposed along a line between the lower and upper enclosure sections 16 and 17, and the lower enclosure 18 and hooded enclosures 19, so as to carry glass sheets into and through the heating furnace 13 and thermal conditioning and cooling sections 14 and 15. The rollers 20 are preferably of relatively small diameter and positioned closely adjacent one another so as to minimize the distance between lines of support for the sheets. The rollers may advantageously be fabricated of fused silicon or quartz, and are mounted within the conveyor system so as to be readily replaceable in case of damage to their surfaces. In order to accomplish the aims of the invention the rolls must also be driven in both the forward and reverse directions in a controlled, positive interrelated manner throughout the length of the conveyor.

Figure 4:
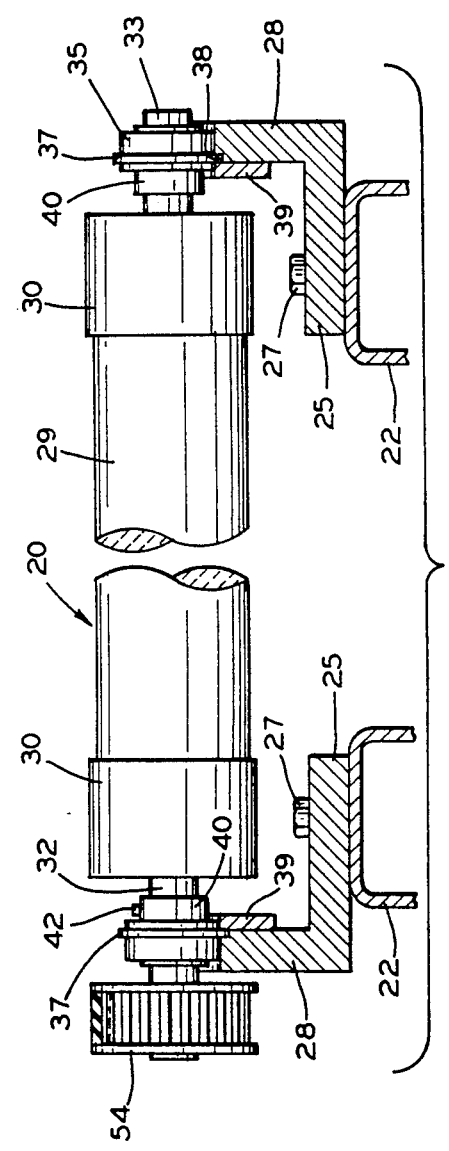
FIG. 4 is an enlarged, transverse view of the roller conveyor, partially in section, taken substantially along line 4—4 of FIG. 3.

To that end the conveyor 12 comprises, along either side of the facility, a longitudinal support beam 22 affixed to posts 23 carried at spaced intervals therealong upon a supporting surface 24. As best seen in FIG. 4, angle members 25 affixed to the support beams as by lag bolts 27 have upstanding legs 28 serving as support members for the rollers. The rollers 20 conventionally comprise ceramic cylinders 29 having end caps 30 affixed thereto. One of the end caps includes a drive axle 32 and the other includes a mounting shaft 33.

The upstanding legs 28 are provided at spaced intervals therealong with oppositely disposed pairs of upwardly opening, semi-circular recesses 34. The collars of bearings 35 upon the drive axles and mounting shafts 32 and 33, respectively, are received within the recesses for supporting the rollers. Retaining rings 37 on the bearing collars are adapted for reception in corresponding retaining ring recesses or grooves 38 formed around the recesses 34 at the inwardly directed faces of the upstanding legs 28. Bearing retainer plates 39 positioned along the face of the legs 28 and retainer rings restrain the bearing collars against lateral movement while permitting the rollers and bearings thereon to be lifted from the recesses 34 in the upstanding legs 28. Central sleeves 40 of the bearings on the drive axles 32 are affixed to the drive axle as by a set screw 42 to restrain the roller against axial movement, while the sleeves 40 of the bearings on the mounting shafts 33 are free to move axially along the shafts to accommodate axial expansion and contraction of the rollers.

In order to convey the sheets into and through the facility 10 in accordance with the invention, it is important that the rollers be driven in a positive synchronized manner. Thus, the rollers must be driven so as to be capable of stopping at precise positions, and rapidly reversing direction in order to convey the sheets or stacks of sheets in a reciprocatory manner with a predetermined length of stroke upon each reversal in direction. The peripheral speeds of the rollers with which the sheets are in contact at any given time should be equal in order to avoid relative movement between the sheet and roller surfaces, which may adversely affect either or both. It is also important in accordance with the invention that the relative angular positions of the rollers be maintained to insure that the lines of contact between the rollers and sheet surfaces are appropriately shifted in accordance with the predetermined pattern upon each reversal of direction during the oscillating program.

The facility 10, by its nature, may be utilized to heat and thermally condition glass sheets having a wide range of dimensions varying from a few inches to several feet in length or width. The smaller sheets may advantageously be transported through the facility and processed in groups, or so-call loads, for purposes of efficiency of operation, while very large sheets may be processed through the facility individually. In any event, for purposes of flexibility in adapting the facility to efficiently handle a wide range of sheet sizes, the rollers 20 of the conveyor system 12 are driven in groups, with each group being driven by a separate drive unit. Operation of the several drive units is coordinated to advance the individual sheets or loads of sheets through the facility in accordance with a predetermined program.

Figure 3:
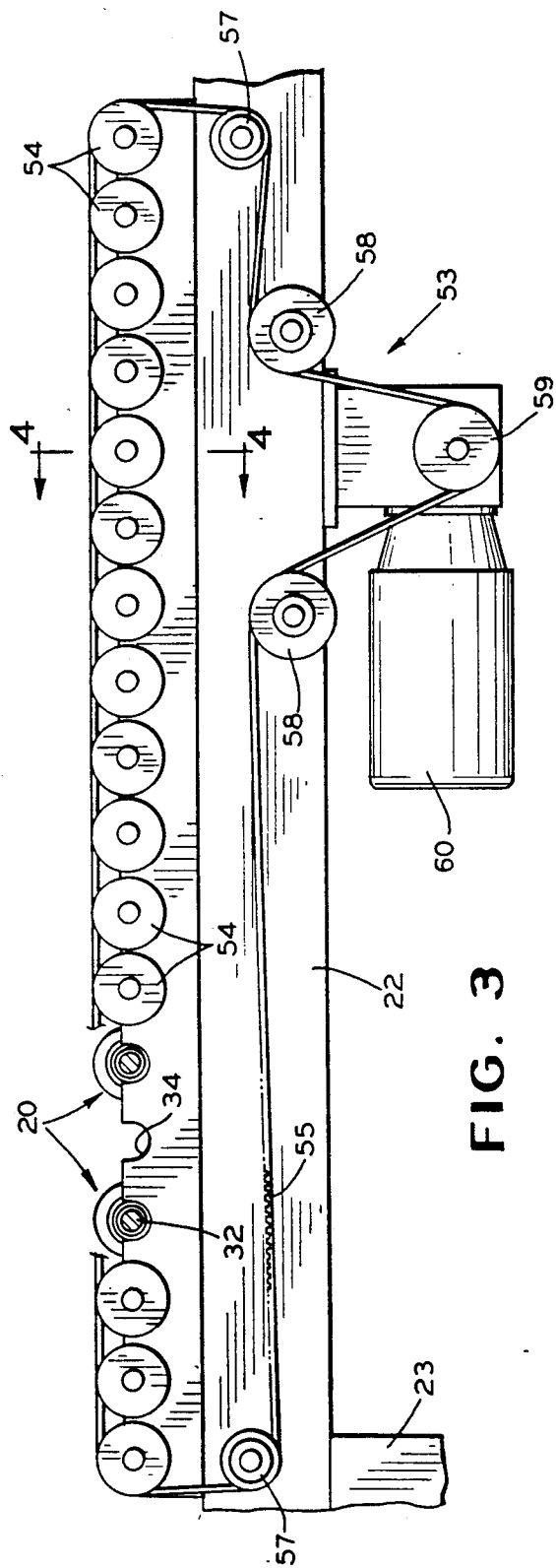
FIG. 3 is an enlarged, fragmentary, side elevational view of one of the roller groups and associated drive mechanism of which the conveyor is comprised.

More particularly, as illustrated in FIG. 1 the conveyor system 12 is comprised of a series of independent conveyor segments 44 through 51 disposed end-to-end so as to define a continuous path through the facility. As best seen in FIGS. 3 and 4, each of the independent segments includes a plurality of the rollers 20 positioned closely adjacent one another and driven by a separate drive system identified generally at 53. To that end, there is affixed to the drive axle 32 of each roller 20 a toothed drive gear 54. The upper flight of a timing drive belt 55 extends over and in driving engagement with the drive gears of the rollers of the conveyor segment. The drive belt has a correspondingly configured surface adapted to matingly engage the teeth of the drive gears and insure that the rollers are positively driven in timed relationship. The belt is entrained about first idler pulleys 57 affixed to the support beam 22 beneath the end ones of the drive gears 54, and then over second idler pulleys 58 carried by the support beam and around a toothed drive gear 59 of a variable speed, reversible drive unit 60. Either or both of the second idler pulleys may be mounted to conventionally serve as belt tensioners as by being adjustably moveable along the beam 22, or carried by a spring loaded arm (not shown). By thus driving the rollers 20 in a positive, timed manner, they can be stopped and started in unison and their direction of rotation can be quickly reversed so as to minimize the time period during which the glass sheets remain in static contact with the roller surfaces. Since the rollers are driven in timed relationship, the rollers of each conveyor segment maintain a constant angular relationship and their peripheral surface speeds are identical. Thus, by suitably controlling operation of the conveyor segments glass sheets or loads of sheets can be advanced along the conveyor system in a predetermined oscillating manner whereby upon each reversal in direction the lines of contact between the lower surfaces of the sheets and the peripheral surfaces of the rollers are displaced. In other words, as each sheet is conveyed through the facility in an oscillating manner the points of static contact between the sheet surface and roll surfaces are distributed over the surfaces so as to distribute the thermal effect of roller contact over the sheet. The synchronized rotation of the rollers likewise assures that all rollers have the same peripheral velocity so as to prevent surface-damaging relative movement between an individual roller and the sheets.

To that end, in accordance with the invention the conveyor segments within at least the heating furnace 13 are programably controlled to oscillate the glass loads according to a predetermined sequence of forward and rearward strokes of varying length. The length of each stroke is calculated to assure that the lines of contact between the rollers and glass surfaces upon reversal of direction are displaced or dispersed over the length of the sheets during each cycle of oscillation so as to minimize formation of so-called roll marks upon the lower surfaces of the sheets. It is, of course, desirable that the sheets achieve a high degree of temperature uniformity over their entire area from the leading to the trailing edge, and it has been found that the temperature pattern is significantly influenced by the contact of the rollers with the glass. The glass load may suitably be oscillated in a variety of predetermined patterns to achieve the desired effect. By way of example, the oscillation may begin with a stroke of a given length, and then the length of the stroke may be decreased or increased by a predetermined arithmetic or geometric factor upon each reversal in direction until the oscillating cycle is completed, or the cycle may be repeated for further heating. The glass load may then be advanced to the next station for further thermal conditioning.

Figure 2:
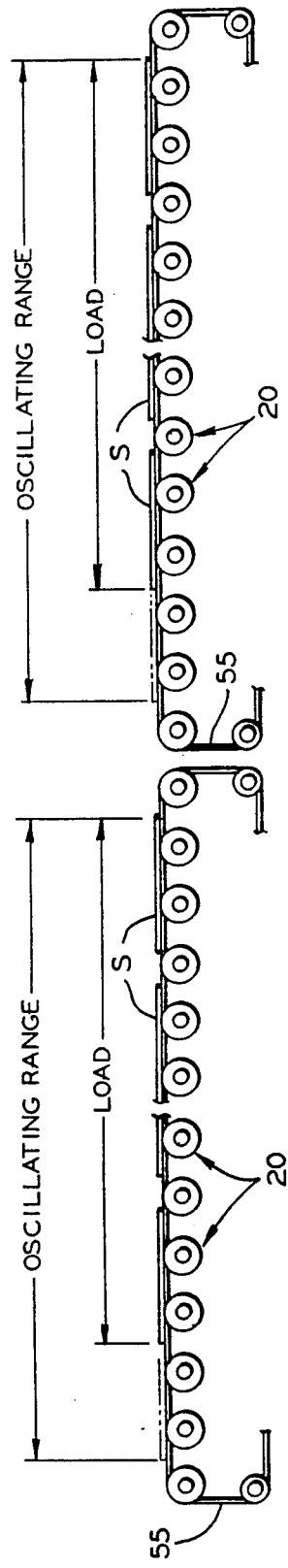
FIG. 2 is an enlarged, fragmentary, schematic, longitudinal elevational view of a portion of the roller conveyor of the invention.
Figure 5:
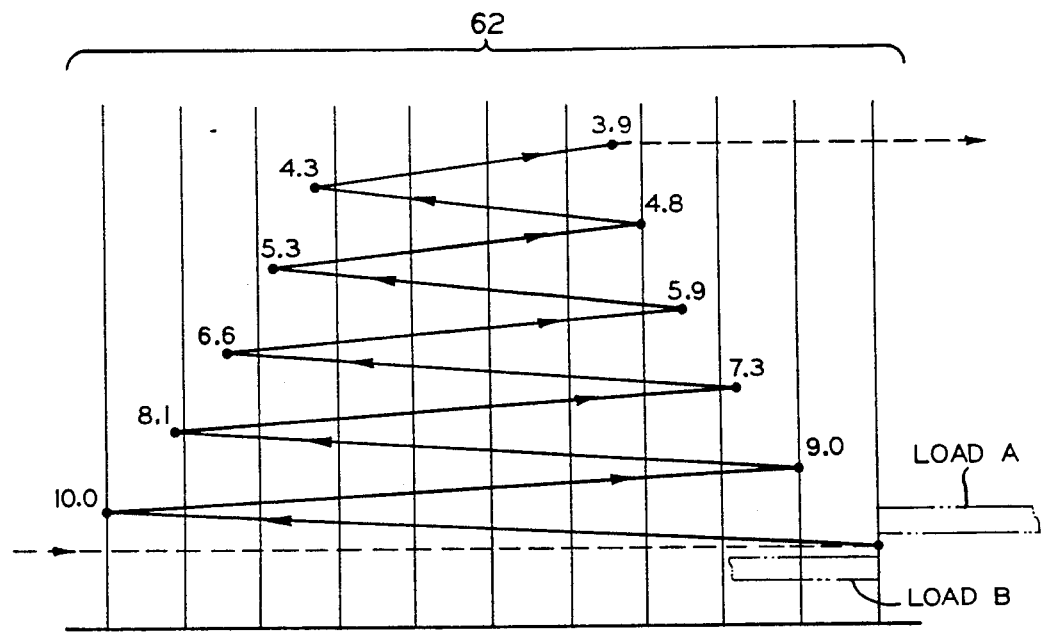
FIG. 5 is a schematic view depicting an oscillating pattern for a glass load in accordance with the invention.

There is illustrated schematically in FIG. 5 an oscillating sequence of a decaying or decreasing stroke type, found very suitable for heating glass sheets in accordance with the invention. The horizontal axis of FIG. 5 represents a zone of oscillation 62 traversed by the leading edge of the lead glass sheet S of a glass load. The space between the vertical lines represents the circumference of the rollers 20, that is, the distance traveled by the glass load upon each revolution of the rollers. As indicated above and as illustrated in FIG. 2, in order to fully utilize the heating furnace, the oscillating range of the glass load preferably utilizes substantially the entire available oscillating window. Thus, the leading edge of the lead sheet of the load will advance to the forward end of the oscillating range upon its forwardmost movement, while the trailing edge of the trailing sheet of the load will advance to the rearward end of the range upon the rearwardmost movement. The oscillating strokes preferably have a maximum length equivalent to about ten revolutions of the rollers 20, and a minimum length of about two revolutions. The glass load is designed within those parameters of sheet size, oscillating range and stroke length to make optimum use of the facility in uniformly heating and thermally conditioning the sheets.

In accordance with the cycle illustrated in FIG. 5, a glass load A has completed an oscillating cycle in the zone 62 and the load is advanced into the next zone, or out of the facility, with the trailing edge of the trailing sheet in the load clear of the zone 62. As the load A advances out of the zone, a succeeding load B may advance into the zone until the leading edge of the leading sheet S reaches the forward end of the zone. The rollers within the zone 62 are then stopped, and their direction of rotation is reversed to convey the glass load rearwardly for a predetermined distance. In the cycle of FIG. 5 the glass load is oscillated in a so-called ten percent decaying mode, that is, the distance travelled upon each succeeding reversal of direction, or stroke, is ten percent less than the preceding stroke. Thus, assuming the glass load is conveyed rearwardly a distance equivalent to 10.0 revolutions of the rollers upon the first stroke of the cycle, it will then be conveyed forwardly a distance equivalent to ninety percent of the preceding stroke, or 9.0 revolutions of the rollers upon the next stroke. This oscillating routine is repeated, with the decreasing distances travelled upon each stroke as illustrated in FIG. 5, until the oscillating cycle is complete. The cycle may typically involve on the order of ten oscillating strokes, with the strokes decreasing in length from 10.0 to 3.9 revolutions of the rollers 20 as illustrated schematically in FIG. 5. When the stroke length is thus varied according to such a predetermined schedule, the lines of contact between the rollers and the glass sheets upon reversal of direction can be distributed over the area of the sheets to minimize the effect of uneven heat transfer and roll marking.

The sequence illustrated schematically in FIG. 5 and described above is given by way of example, and the desired distribution of roller contact can be achieved with other and different patterns of oscillation. Thus, it is contemplated that the distance travelled upon each stroke may change by a greater or lesser amount, or the load may be oscillated in ascending mode, wherein each succeeding stroke increases in length over the preceding stroke. Likewise, the longer and shorter strokes may be interspersed to achieve a similar effect with the strokes being performed in a different sequence.

Figure 6:
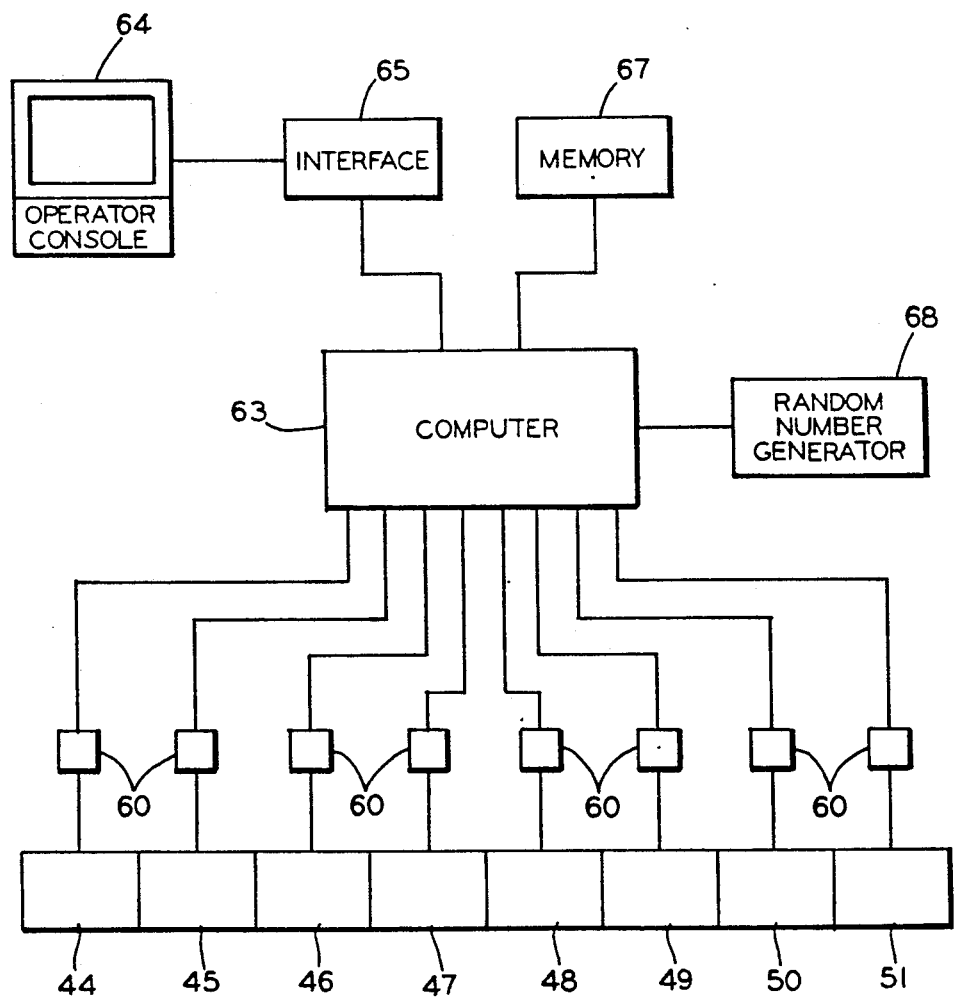
FIG. 6 is a block diagram depicting a control system for the invention.

There is shown schematically in FIG. 6 a system suitable for controlling the conveyor segments 44 through 51 in accordance with the invention. A computer 63 is operably coupled to the drive unit 60 for each of the conveyor segments 44 through 51. An operator console 64 is connected through an interface 65 to the computer for imputing appropriate commands to the computer. An external memory 67 may be employed, and a random number generator 68 may be provided for controlling the interrelated random movements of the conveyor segment to achieve the desired back-and-forth movements of the glass loads. Thus, the system may be suitably programmed to correlate operation of the individual conveyor sections for accommodating glass loads of various dimensions, so as to utilize the facility 10 to its maximum potential in heating and thermally conditioning glass sheets in accordance with the invention.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

What is claimed is:

1. A method of conveying a glass sheet load on a series of separately driven roller conveyor segments disposed end-to-end and defining a path for the load through loading, heating and thermal conditioning zones, comprising placing the load on a conveyor segment in the loading zone, activating selected ones of the conveyor segments to advance the load into the heating zone, oscillating the load back and forth within the heating zone so that the distance travelled on each forward stroke and each reverse stroke is different from the distance travelled on any other stroke whereby the lines of contact of the rollers upon the glass load upon reversal in direction are distributed over the glass load and, upon completion of oscillation, activating selected ones of the conveyor segments to advance the heated glass load out of the heating zone and into and through the thermal conditioning zone.

2. A method of conveying a glass sheet load as claimed in claim 1, wherein said heating zone includes at least first and second conveyor segments, including oscillating said load back and forth on said first segment for partially heating said load, operating said first and second conveyor segments synchronously to advance the partially heated load onto said second segment, and oscillating the load back and forth upon the second conveyor segment so that the distance travelled on each forward stroke and each reverse stroke is different from the distance travelled on any other stroke for further heating the glass load.

3. A method of conveying a glass sheet load as claimed in claim 2, including the step of advancing a second glass load from the loading zone into said heating zone onto said first segment as said first load is advanced onto said second segment, and oscillating the second glass load on said first segment independently of the oscillation of said first load on said second conveyor segment to further heat said first load.

4. A method of conveying a glass sheet load as claimed in claim 1, including oscillating the load back and forth in the thermal conditioning zone so that the distance travelled on each forward stroke and each reverse stroke is different from the distance travelled on any other stroke.

5. A method of conveying a glass sheet load as claimed in claim 1, wherein the distance travelled on each stroke after the initial stroke is less than the distance travelled on the immediately proceeding stroke.

6. A method of conveying a glass sheet load as claimed in claim 5, wherein the distance travelled on each stroke decreases by a predetermined proportion of the distance of the immediately proceeding stroke.

7. A method of conveying a glass sheet load as claimed in claim 6, wherein the predetermined proportion is about one tenth.

8. A method of conveying a glass sheet load as claimed in claim 1, wherein the distance travelled on each stroke after the initial stroke is greater than the distance travelled on the immediately preceding stroke.

9. A method of conveying a glass sheet load as claimed in claim 8 wherein the distance travelled on each stroke increases by a predetermined proportion of the distance of the immediately preceding stroke.

10. A method of conveying a glass sheet load as claimed in claim 1, wherein said heating zone includes at least four conveyor segments, and the glass load is oscillated back and forth on two adjacent synchronized ones of said conveyor segments within said heating zone.

11. Apparatus for heating and thermally conditioning glass sheets, comprising an elongated tunnel-type heating furnace, a thermal conditioning section adjacent the heating furnace, and a conveyor extending through said heating furnace and thermal conditioning unit, said conveyor comprising a plurality of independent conveyor segments disposed end-to-end, each said conveyor segment including a plurality of longitudinally aligned individual rollers whereby said conveyor segments define a path along which the sheets are carried into and through said heating furnace and thermal conditioning unit, driving means for each said conveyor segment for driving the rollers of each segment independently from the rollers of the other conveyor segments, and means operably connecting each said driving means to a central computer for correlating operation of said conveyor segments to advance glass sheets through said heating furnace and thermal conditioning unit on said conveyor segments in accordance with a predetermined program.

12. Apparatus for heating and thermally conditioning glass sheets as claimed in claim 11, wherein said driving means are reversible, and said rollers are adapted to be driven in both directions whereby said glass sheets are carried forwardly and rearwardly in accordance with a predetermined sequence of oscillation on said conveyor.

13. Apparatus for heating and thermally conditioning glass sheets as claimed in claim 11, including means driving the rollers in each said conveyor segment in timed relationship with the other rollers in the conveyor segment.

14. Apparatus for heating and thermally conditioning glass sheets as claimed in claim 13, wherein said means driving the rollers in timed relationship includes a toothed drive gear affixed to each said roller, and a timing drive belt in driving engagement with the drive gear of each of the rollers in a conveyor segment and with the driving means of the conveyor segment.

15. Apparatus for heating and thermally conditioning glass sheets as claimed in claim 12, wherein at least two said conveyor segments are disposed within said heating furnace.

16. Apparatus for heating and thermally conditioning glass sheets as claimed in claim 15, wherein four said conveyor segments are disposed within said heating furnace.

17. A method of conveying a glass sheet load on a series of separately driven roller conveyor segments disposed end-to-end and defining a path for the load through loading, heating and thermal conditioning zones, comprising placing the load on a conveyor segment in the loading zone, activating selected ones of the conveyor segments to advance the load into the heating zone, oscillating the load back and forth within the heating zone according to a predetermined pattern in which the distances travelled on the forward and reverse strokes are varied whereby the lines of contact of the rollers upon the glass load upon reversals in direction are distributed over the glass load and, upon completion of oscillation, activating selected ones of the conveyor segments to advance the heated glass load out of the heating zone and into and through the thermal conditioning zone.

18. A method of conveying a glass sheet load as claimed in claim 17, wherein said heating zone includes at least first and second conveyor segments, including oscillating said load back and forth on said first segment for partially heating said load, operating said first and second conveyor segments synchronously to advance the partially heated load onto said second segment, and oscillating the load back and forth upon the second conveyor segment so that the distance travelled on each forward stroke and each reverse stroke is varied according to a predetermined pattern whereby the lines of contact of the rollers upon the glass load upon reversal in direction are distributed over the glass load for further heating the glass load.

19. A method of conveying a glass sheet load as claimed in claim 18, including the step of advancing a second glass load from the loading zone into said heating zone onto said first conveyor segment as said first load is advanced onto said second conveyor segment, and oscillating the second glass load on said first conveyor segment independently of the oscillation of said first load on said second conveyor segment to further heat said first load.

20. A method of conveying a glass sheet load as claimed in claim 17, including oscillating the load back and forth in the thermal conditioning zone according to a predetermined pattern wherein the distances travelled on the forward and reverse strokes are varied so that the lines of contact of the rollers upon the glass load upon reversal in direction within the thermal conditioning zone are distributed over the glass load.

* * * * *